United States Patent
Dunn et al.

(10) Patent No.: US 9,503,683 B2
(45) Date of Patent: Nov. 22, 2016

(54) PROVIDING USERS ACCESS TO APPLICATIONS DURING VIDEO COMMUNICATIONS

(71) Applicant: Google Inc., Mountain View, CA (US)

(72) Inventors: Richard James Dunn, Seattle, WA (US); Amit Fulay, Kirkland, WA (US); (Continued)

(73) Assignee: Google Inc., Mountain View, CA (US)

( * ) Notice: Subject to any disclaimer, the term of this patent is extended or adjusted under 35 U.S.C. 154(b) by 634 days.

(21) Appl. No.: 13/731,570

(22) Filed: Dec. 31, 2012

(65) Prior Publication Data
US 2013/0263021 A1 Oct. 3, 2013

Related U.S. Application Data

(60) Provisional application No. 61/616,405, filed on Mar. 27, 2012.

(51) Int. Cl.
*G06F 3/00* (2006.01)
*H04N 7/14* (2006.01)
(Continued)

(52) U.S. Cl.
CPC .......... *H04N 7/147* (2013.01); *H04L 12/1827* (2013.01); *H04N 21/4532* (2013.01); (Continued)

(58) Field of Classification Search
None
See application file for complete search history.

(56) References Cited

U.S. PATENT DOCUMENTS

2006/0010197 A1* 1/2006 Ovenden ................ G06Q 10/00
709/204
2007/0233785 A1* 10/2007 Abraham ............. G06Q 10/107
709/204
(Continued)

FOREIGN PATENT DOCUMENTS

EP 1761048 3/2007

OTHER PUBLICATIONS

Extended European Search Report for PCT/US2013033742, dated Dec. 11, 2015, 11 pages.
(Continued)

*Primary Examiner* — Hua Lu
(74) *Attorney, Agent, or Firm* — Patent Law Works LLP

(57) ABSTRACT

The present disclosure, in some implementations comprises systems and methods for providing applications during video communication, via online communities or services, for example, social networks. Video communication may be video conferencing or "video chat" sessions among a plurality of users of the online services. Users may engage in a video conference or "video chat," yet at the same time, use or obtain different applications, designated as either "personal" or "shared" applications. A "personal" application is one that does not involve others and is configured to enhance an individual user's personal experience during a group video communication. A "shared" application is one that involves at least one of multiple users during a group video communication, for example, users may participate in a card or trivia game, watch videos together, collaborate and share documents, or the like.

20 Claims, 11 Drawing Sheets

(72) Inventors: Chee Chew, Redmond, WA (US);
Alexander Jan Verhage, Oakland, CA (US)

(51) Int. Cl.
*H04N 21/4788* (2011.01)
*H04L 12/18* (2006.01)
*H04N 21/45* (2011.01)
*H04N 21/63* (2011.01)
*H04N 21/81* (2011.01)
*H04N 21/858* (2011.01)
*H04L 12/58* (2006.01)

(52) U.S. Cl.
CPC ........ *H04N 21/4788* (2013.01); *H04N 21/632* (2013.01); *H04N 21/8173* (2013.01); *H04N 21/8586* (2013.01); *H04L 51/32* (2013.01)

(56) References Cited

U.S. PATENT DOCUMENTS

| | | | | |
|---|---|---|---|---|
| 2008/0120374 A1* | 5/2008 | Kawa | ............. | H04L 63/104 709/204 |
| 2008/0168154 A1* | 7/2008 | Skyrm | ............. | H04L 65/601 709/218 |
| 2009/0019374 A1* | 1/2009 | Logan | ............. | H04M 3/4872 715/753 |
| 2009/0094247 A1 | 4/2009 | Fredlund, Jr. et al. | | |
| 2009/0254843 A1* | 10/2009 | Van Wie | ............. | H04L 12/1822 715/757 |
| 2010/0159904 A1* | 6/2010 | Colligan | ............. | G06Q 30/02 455/414.2 |
| 2011/0078716 A1* | 3/2011 | MacWan | ............. | H04H 60/32 725/14 |
| 2011/0252357 A1* | 10/2011 | Chaudhri | ............. | G06F 3/04883 715/780 |
| 2011/0289157 A1* | 11/2011 | Pirnazar | ............. | G06F 17/30873 709/206 |
| 2011/0302509 A1* | 12/2011 | Leacock | ............. | G06Q 10/10 715/756 |
| 2012/0311686 A1* | 12/2012 | Medina | ............. | H04L 63/0807 726/7 |
| 2012/0324001 A1* | 12/2012 | Leacock | ............. | H04L 51/043 709/204 |
| 2013/0110921 A1* | 5/2013 | Logan | ............. | G06F 17/30053 709/204 |
| 2013/0321340 A1* | 12/2013 | Seo | ............. | G06F 1/1641 345/174 |

OTHER PUBLICATIONS

International Search Report and Written Opinion for PCT/US2013/033742, dated Jul. 10, 2013, 34 pages.

* cited by examiner

PROVIDING USERS ACCESS TO APPLICATIONS DURING VIDEO COMMUNICATIONS

CROSS REFERENCE TO RELATED APPLICATIONS

The present application claims the benefit of priority under 35 U.S.C. §119(e) of U.S. Provisional Application No. 61/616,405 entitled "Providing Users Access to Applications During Video Communications," filed on Mar. 27, 2012. The entire contents of the provisional application are incorporated by reference herein.

BACKGROUND

The present disclosure relates to video communication between users of online communities or services, for example, social networks. In particular, the present disclosure relates to group video communication sessions among multiple users, for example, via video conferencing or a group "video chat," during which, users have access to either "personal" or "shared" applications or both, that may be provided by third parties and executed by any or all of the users during the video communication sessions.

The popularity of electronic communications, in particular, via online communities or services, for example, social networks, has grown dramatically over the years. More recently, some social networks provide video communication or "live" exchanges between multiple users in real-time. One social network creates a virtual facility or "room" for multiple users to communicate in, for example, to "hangout" and "video chat."

A "hangout" is a video conference that is used via a social network that may be shared with a large number of users, specific groups of users, or specific users. The video conference is easily started and operated within the browser, without downloading and installing software on a user's computer (except perhaps a quick browser plugin), as a result of which everything works seamlessly within the web browser. A user clicks within the social network to launch a video conference with other users, which functionality is seamlessly delivered to the users. A user can invite specific people to join a group video chat and anyone who joins may in turn share a URL ("uniform resource locator" or web address) and invite yet others to join. Although participant identifications appear in all of the participants' streams, such gatherings are not public.

Existing technology recognizes who is speaking during such a video conferencing session and that person's image appears on a primary display window, while other participants appear in smaller display windows. Thus, with a browser-based solution and with the ability to connect more than just two sites, real-time video-conferencing has become more ubiquitous.

This virtual facility with a group video communication session may be broadcast to yet other users of the social network, who may participate as either spectators or viewers. The viewing occurs over a live stream, like watching a webinar or a "live" concert online. A user who is a spectator or viewer may have the option to join and participate in the virtual facility or simply elect to just watch or listen without joining.

To further enhance the ongoing trends in video communication, it would certainly be beneficial to find ways to access applications, provided by third parties, for both personal and shared use, to enhance group video communications.

SUMMARY

The present disclosure overcomes the deficiencies and limitations of the prior art. In some embodiments, the technology comprises systems and methods for providing or obtaining applications, during video communication sessions, via online communities or services, for example, social networks. Video communication may be video conferencing or "video chat" sessions among a plurality of users of the online services, also referred to as "hangouts." Users may launch or engage in a video conference or "video chat" session, yet at the same time, use or obtain different applications, designated as either "personal" or "shared" applications. A personal application is one that does not involve others and is configured to enhance an individual user's personal experience during a group video communication. A personal application is an extension, which may for example be, an application to add video and audio effects, perform translation of the content, take notes, etc. A shared application is one that involves multiple other users during a group video communication session, for example, users may participate in a card or trivia game, view videos together, collaborate and share documents, or the like.

In addition, in some embodiments, the systems and methods of the present technology obtain both personal and shared applications by launching a video conference or video chat session with a special URL (uniform resource locator or web address), which loads the personal or shared application into the video conference or video chat session and registers the video conference or video chat session to the user. This method advantageously permits application developers to enable users to share and launch applications, facilitating a viral distribution of applications.

In yet other embodiments, the systems and methods of the present technology are configured to obtain both shared and personal applications during a "live" video communication exchange or session among users, where a user can operate multiple personal applications concurrently. The systems and methods provide a user interface configuration with a "primary" designation to a particular user, in order to permit the particular user to use or join a video communication session and have quick and easy access to his or her personal applications. The systems and method enable personal applications or extensions within a group video communication session, by allowing a developer of the personal applications, for example, a third party developer, to specify its application and register it with the social network or online service, via which users participate in video communication sessions. Once registered with the social network or the online service, in some embodiments of the technology, the user interface is configured with a smaller pane within the video communication facility or room. The personal application is loaded into the smaller pane, so that it does not interfere with the main video feed or shared application. Multiple shared applications in a group video communication session may operate at one time. A user may decide to engage in a single application or a plurality of applications sequentially.

In still other embodiments, the systems and methods of the present technology keep track of the list of shared applications operating and the users involved in each. This data is also displayed to users, in an "Apps Pane" in a user interface of the group video communications session, permitting users to conveniently switch between shared applications or load a new application, as desired. The systems and methods of the present technology inform all users when a new application is loaded and provides each user with a record of all applications used in the past, a capability to indicate favorite applications or "pin" them.

In yet other embodiments of the present technology, a list of both personal and shared applications may be obtained from a list of featured applications maintained by the social network or online community.

Shared applications may also be "discovered" by users within a "hangout," by viewing which applications are in use by others in a particular "hangout." This association may be detected by application-specific markings within the filmstrip or participant-specific markings within the "Apps" directory.

Shared applications may also be discovered through the use of a "Most Recently Used" list ("MRU"). This may be a list of applications, accessible to all users in a particular "hangout." This list may include a union of all shared applications that have been used by all the participants in the particular "hangout." There may or may not be a limit to the number of applications included in this list.

In some implementations, personal applications may be private. For example, the visibility of the application can be blocked. In some implementations, personal applications may transmit communications along a primary channel. Shared applications may transmit communications along a primary channel and provide a secondary channel for other communications.

BRIEF DESCRIPTION OF THE DRAWINGS

The present disclosure is illustrated by way of example, and not by way of limitation, in the figures of the accompanying drawings, in which like reference numerals are used to refer to similar elements.

DETAILED DESCRIPTION

Users obtain both "personal" and "shared" applications by launching a group video communication via a special URL, which loads the application into the group video communication and registers it to the user. A user may operate multiple "personal" applications. A special primary designation in the user interface display to a user, permits the user to use or join a video communication and have easy access to his or her personal applications. The systems and methods maintain a list of shared applications and the users involved in each is maintained, which list is displayed to users, and permits users to conveniently switch between "shared" applications or load a new application. The system and method informs all users when a new application is loaded and provides each user with a record of all applications used in the past, a capability to indicate favorite applications etc.

In one embodiment, the invention comprises a system and method for providing personal and shared applications. Specifically, the invention comprises a system and method for providing personal and shared applications to a video conference. For example, multiple users are engaged in a video conference and use different applications. A personal application is an application that does not include a necessity to involve others in the video conference (e.g. applications to add video and audio effects, perform translation of the content, take notes, etc.). A shared application is used by multiple people in the video conference (e.g. a card game, a trivia game, shared video watching, document collaboration, etc.).

In one embodiment, the system obtains both personal and shared application via launching a video conference with a special URL that loads the application into the video conference and registers the video conference to that user.

In one embodiment the system includes a method for sharing both shared and personal application via the video conference. For example, a first user shares a shared application with a second user and the second user registers that application under his user account. The system also includes a method for determining applications that have been used previously.

In some examples, the specification describes systems and methods for group video communication sessions for users of an online community or service, for example, social networks, during which users may access applications provided by third party developers, either for "personal" or "shared" use or both. By way of one example, an application may be a web application that may be accessed over a network such as the internet or the intranet. The term as used here also refers to a computer software application that is coded in a browser-supported language, for example, JavaScript, combined with a browser-rendered markup language like HTML and reliant on a common web browser to render the application executable.

Figure 1:
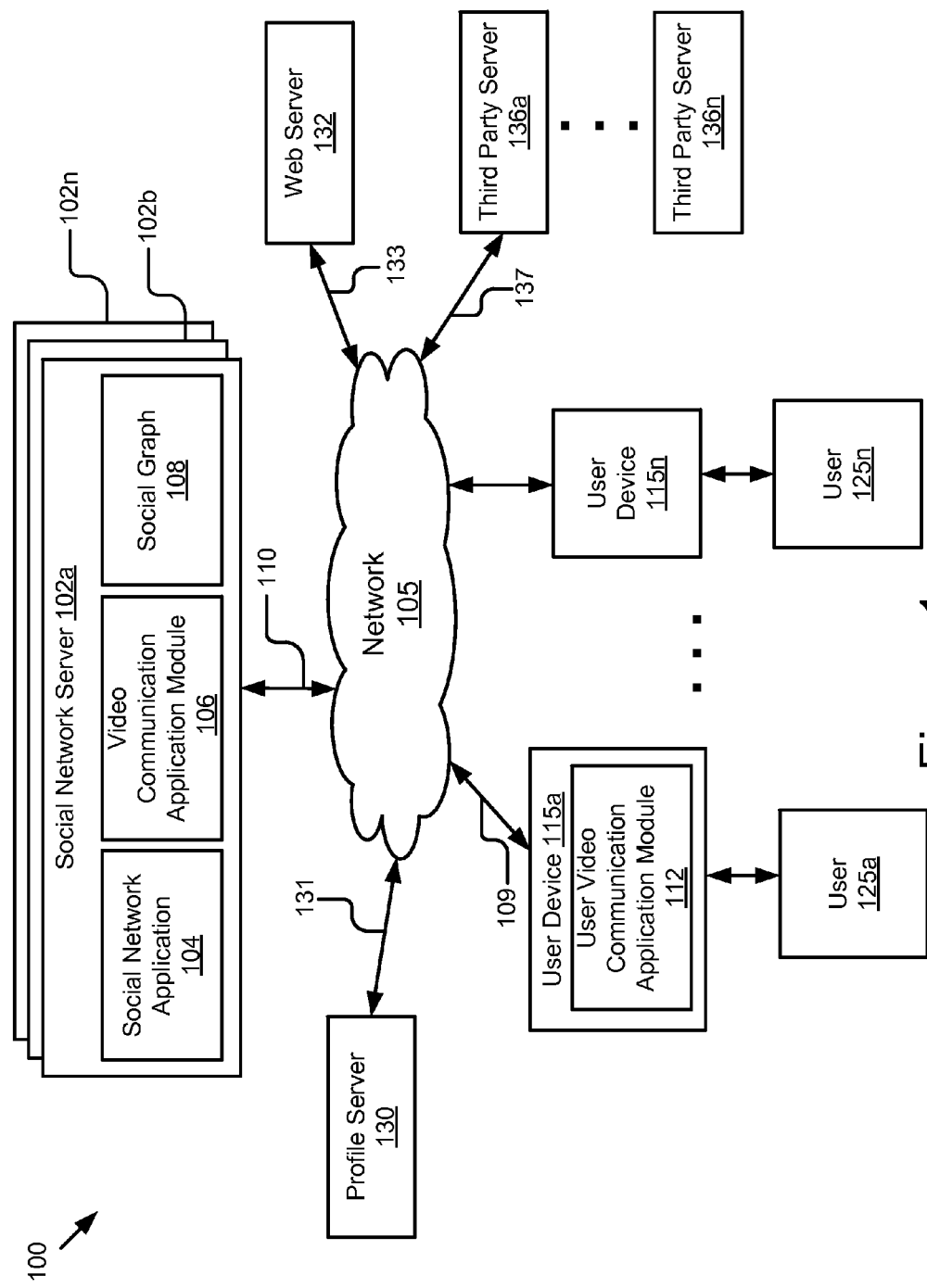
FIG. 1 is a high-level block diagram illustrating some embodiments of a system for providing users access to applications during group video communication sessions, for example, during a video conference, "video chat," etc., including a social network server with a video communication application module.

FIG. 1 is a high-level block diagram illustrating an example system 100 with a video communication application access module of the present technology. The system 100 includes one or more social network servers 102a, 102b, through 102n. The social network server 102a includes a social network application 104, a video communication application access module 106, and a social graph 108.

In some embodiments, the social network server 102a is coupled to the network 105 via a signal line 110. The social network server 102a includes the social network application 104, which includes the software routines, application programming interface (API) etc., to operate the social network hosted on the social network server 102a. Although only one social network server 102a is described here, persons of ordinary skill in the art should recognize that multiple servers may be present, as illustrated by social network servers 102b through 102n, each with functionality similar to social network server 102a or different.

The term "social network" as used here encompasses its plain and ordinary meaning including, but not limited to, any type of social structure where the users are connected by a common feature or link. The common feature includes relationships/connections, e.g., friendship, family, work, a similar interest, etc. The common features are provided by one or more social networking systems, such as those included in the system 100, including explicitly-defined relationships and relationships implied by social connections with other online users, where the relationships form a social graph 108.

The term "social graph" as used here encompasses its plain and ordinary meaning including, but not limited to, a set of online relationships between users, such as provided by one or more social networking systems, such as social network system 100, including explicitly-defined relationships and relationships implied by social connections with other online users, where the relationships form a social graph. In some examples, the social graph 108 may reflect a mapping of these users and how they are related.

It should be understood that social network server 102a and the social network application 104 are representative of a single social network. Each of the plurality of social network servers 102a, 102b, through 102n, is coupled to a network 105, each having its own server, application, and social graph. For example, a first social network may be directed to business networking, a second directed to or centered on academics, a third directed to local business, a fourth directed to dating, and yet others directed to other general interests or perhaps a specific focus.

The system 100 is accessed by user devices 115a through 115n that are variously used by users 125a through 125n. These entities are coupled to communicate via the network 105. Although only two user devices 115a through 115n are illustrated in FIG. 1, persons of ordinary skill in the art should recognize that any numbers of user devices 115n may be used by any number of users 125n. Moreover, those skilled in the art should recognize that while the present disclosure is described below primarily in the context of social networks, the present disclosure may be applicable to any type of online communications, via any online communities or services, including search engines.

The user devices 115a through 115n in FIG. 1 are illustrated by way of example. Although FIG. 1 illustrates only two devices, the present disclosure applies to any system architecture having one or more user devices 115n, therefore, any number of user devices 115n may be used. Furthermore, while only one network 105 is illustrated as coupled to the user devices 115a through 115n and the social network servers 102a-102n, in practice any number of networks 105 may be connected to these entities. In addition, FIG. 1 illustrates a profile server 130, a web server 132, and third party servers 136a through 136n coupled via the network 105. The system 100 may include one or more third party servers 136n. In addition, although only one profile server 130 and web server 132 are illustrated, any number of profile servers 130 or web servers 132 may be included, in a distributed or other architecture. The profile server 130 stores profile data on each of the users within the social network servers 102a through 102n. The web server 132 may either be hardware (one or more computer systems) or software (the computer application) or both that helps to deliver content that may be accessed via the internet. Web servers typically host online services, for any purpose, including data storage, gaming etc.

The user devices 115a through 115n can be a computing device, for example, a laptop computer, a desktop computer, a tablet computer, a mobile telephone, a personal digital assistant (PDA), a mobile email device, a portable game player, a portable music player, a television with one or more processors embedded therein or coupled thereto or any other electronic device capable of accessing a network.

The network 105 is of conventional type, either wired or wireless, and may have any number of configurations such as a star configuration, token ring configuration, or other configurations known to those skilled in the art. Furthermore, the network 105 may comprise a local area network (LAN), a wide area network (WAN, e.g., the Internet), and/or any other interconnected data path across which one or more devices may communicate.

In another embodiment, the network 105 may be a peer-to-peer network. The network 105 may also be coupled to or include portions of one or more telecommunications networks for sending data in a variety of different communication protocols.

In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

The social network server 102a comprises the social network application 104, the video communication application module 106, and the social graph 108, all of which are configured to seamlessly deliver video communication functionalities to users hosted by the social network server 102a, and to seamlessly provide access to applications provided by one or more third party servers 136a through 136n. Each of the third party servers 136a through 136n may provide applications, facilitated by the social network servers 102a through 102n, by loading an arbitrary web page (contained in an IFRAME) within the area enclosed (or room created) by the group video communication session. The underlying program of the social network servers 102a through 102n, also provides a Java file, which may be used by those web pages to set up two-way communication through a defined API (application programming interface) across the IFRAME border, which permits the web page (designed as a web application) to interact with the user interface of the social network server 102a through 102n. Each of the user devices 115a through 115n, coupled to the network 105, via signal line 109, is illustrated with a user video communication application module 112 to indicate aspects of the video communication that reside in the user devices 115a through 115n.

Figure 2:
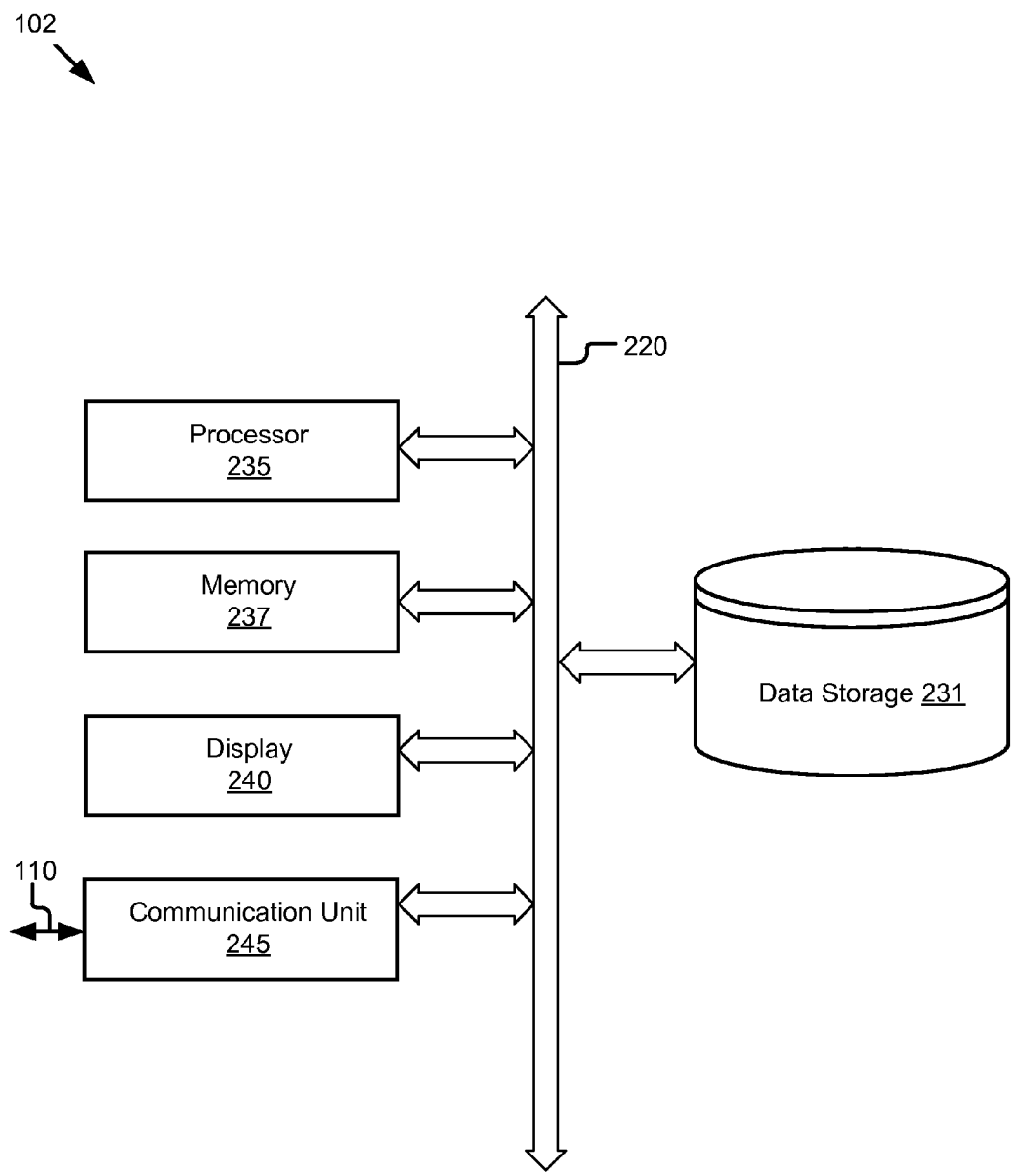
FIG. 2 is a block diagram illustrating some embodiments of hardware components of the social network server including a video communication application module illustrated in FIG. 1.

Referring now to FIG. 2, an example of the video communication application module 106 of the social network servers 102a through 102n is coupled to the user device 125a, over signal line 220, which also couples the video communication application module 106 to other hardware components of the social network server 102a.

The social network server 102a includes one or more processors 235, each comprising an arithmetic logic unit, a microprocessor, a general purpose controller or some other processor array to perform computations and provide electronic display signals to the user device 125a. The processor 235 is coupled to a bus 220 for communication with the other hardware components. The processor 235 processes data signals and may comprise various computing architectures, including a complex instruction set computer (CISC) architecture, a reduced instruction set computer (RISC) architecture, or an architecture implementing a combination of instruction sets. As indicated above, although only a single processor is shown in FIG. 2, a plurality of processors may be used. The social network server 102a also includes a memory 237, and a display 240, which communicate with the user's device 115a, via a graphic adapter, a data storage 231 and a communication unit 245. It should be obvious to one skilled in the art that other processors, operating systems, sensors, displays, and physical configurations may be used to perform the functionalities and operations, instead of the ones described here.

The memory 237 stores instructions and/or data that may be executed by processor 235. The memory 237 is coupled to bus 220 for communication with the other hardware components illustrated. The instructions and/or data may comprise code for performing any and/or all of the techniques described here. The memory 237 may be a dynamic random access memory (DRAM) device, a static random access memory (SRAM) device, flash memory or some other memory device known in the art.

In some embodiments, data storage 231 stores data, information, and instructions relating to the users. Such stored information includes information about the users and other information retrieved by activity stream input via line 110. In one embodiment, the data storage 231 also stores data and other information utilized by the social network server 102a through 102n. Data storage 231 is a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. The data storage 231 is coupled by the bus 220 for communication with the other components of servers 102a and 102n, including the social network application 104.

It should be noted that any information that is retrieved for particular users is only upon obtaining the necessary permissions from the users, in order to protect user privacy and any sensitive information of the users.

The communication unit 245 includes a network adapter 202 that interfaces with the network 105 and other components. It includes ports for wired connectivity, for example, USB, SD, or CAT-5, etc. The communication unit 245 functions as an interface module to link the processor 235 to the network 105, which in turn may be coupled to other processing systems. The communication unit 245 provides other conventional connections to the network 105 using standard network protocols such as TCP/IP, HTTP, HTTPS and SMTP, as should be understood to those skilled in the art. In other embodiments, the communication unit 245 includes a transceiver for sending and receiving signals using WiFi, Bluetooth® or cellular communications for wireless communication.

Figure 3:
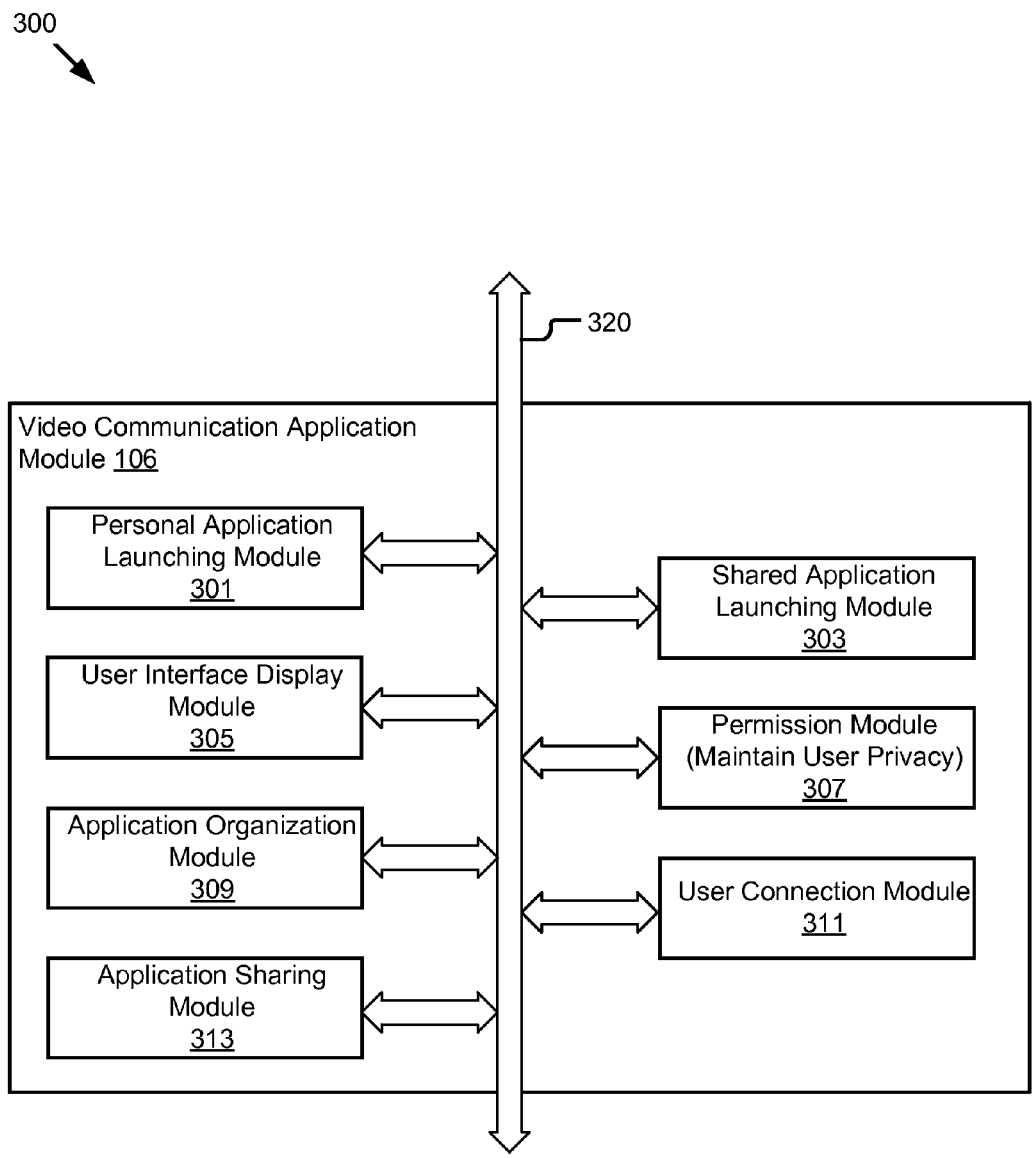
FIG. 3 is a block diagram illustrating some embodiments of software components of the video communication application module illustrated in FIG. 1.

Referring now to FIG. 3, an example video communication application module 106 comprises a plurality of different modules including software routines and instructions that form the framework for executing the applications for users during group video communication sessions. The applications may be either "personal" or "shared." Personal applications are those that a particular user, for example, user 125a may enjoy to enhance his or her video communication experience. A particular user 125a may execute any number of personal applications via a personal application launching module 301. By way of example, personal applications include "Effects" which render graphics (i.e., hats) and audio (i.e., head slaps) or a note-taking application. These personal applications may be executed concurrently on the user's device 115a. Alternatively, or in addition to, launching a personal application, a user may execute and share an application with another user, via a shared application launching module 303. Either of the personal application or the shared application selected by the particular user 125a is displayed on the user device 115a, via a user interface display module 305. An application organization module 309 sorts and organizes a history of the application launched by the user. An application sharing module 313 facilitates sharing between two or more users. In all instances, a permission module 307 oversees sharing of applications between users to ensure that all privacy requirements are maintained. A user connection module 311 uses connections with other users for video communication. For example, the particular user 125a may simply open a "chat" window, in his or her account associated with the social network, or email account (linked or associated with the social network), click on the "Options" menu provided, and choose "Add voice/video chat," which guides the user 125a through a one-time installation of a free plug-in (for example, a quick 2 MB download). The user 125a may then re-open his or her email account and note that the Options" link in the "chat" window has changed to "Video & more". Upon opening this menu and clicking on the "Start video chat," the user 125a should be able to see and hear his or her partner (the party called) in high-quality video. By manipulating the video, the user 125a may enlarge the video and change its size and position, or switch to a full screen display.

The video communication application module 106 includes applications that communicate over the software communication mechanism 320. The software communication mechanism 320 may be an object bus (such as CORBA), direct socket communication (such as TCP/IP sockets) among software modules, remote procedure calls, UDP broadcasts and receipts, HTTP connections, function or procedure calls, etc. Further, any or all of the communication could be secure (SSH, HTTPS, etc.). The software communication can be implemented on any underlying hardware, such as a network, the Internet, a bus 220, a combination thereof, etc.

Figure 4A:
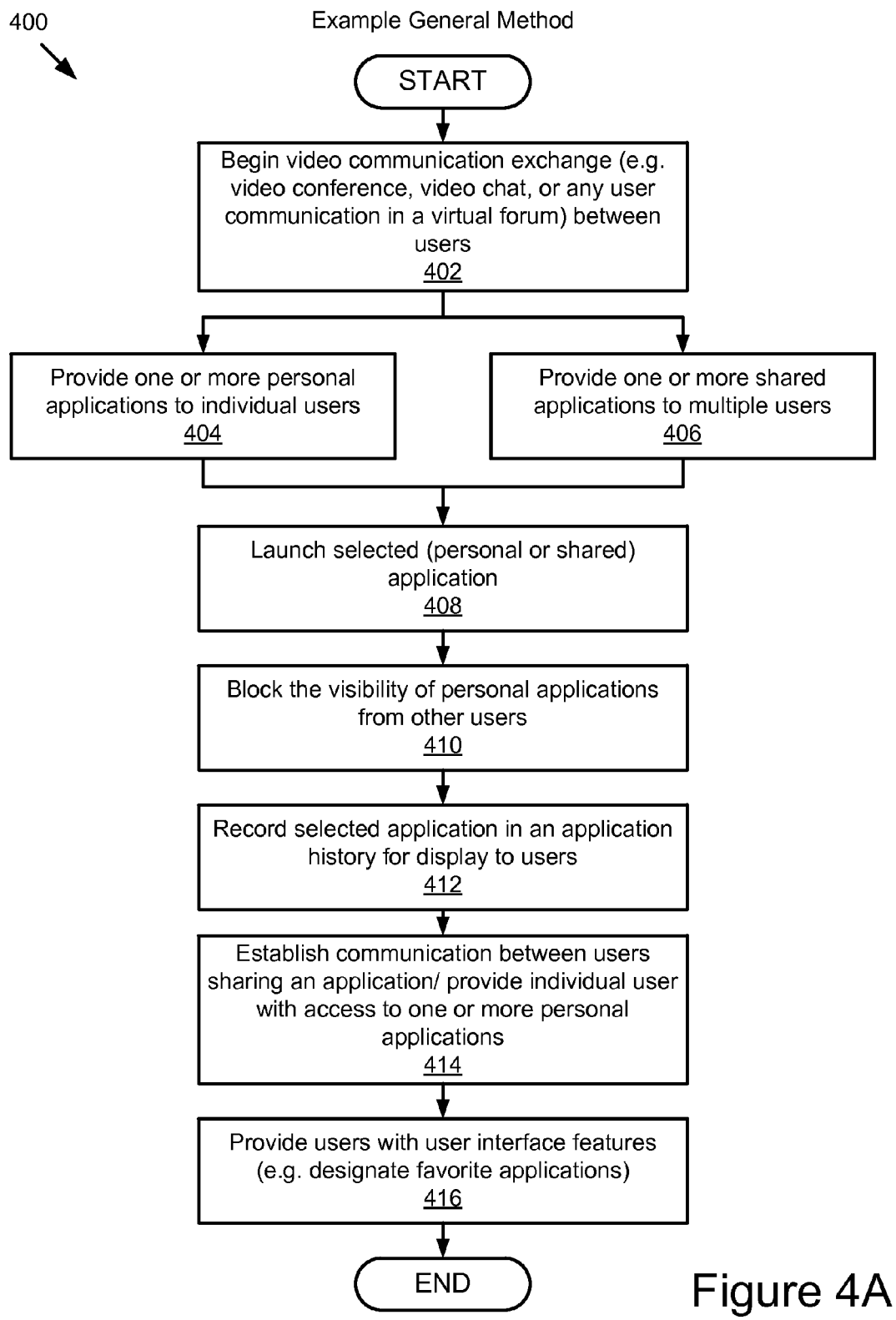
FIG. 4A is one example of a general method by which the video communication application module operates.

FIG. 4A illustrates one example of a general method for providing applications by third parties to users of an online service, for example, a social network. The method is illustrated generally by reference numeral 400. The method begins at block 402, with a video communication exchange, for example, a video conference, video chat, or any user communication in a virtual forum, facility, or room, among multiple users. The method proceeds to block 404, at which point, within the user interface display module 305, the method provides one or more personal applications to individual users from the multiple users engaged in a video communication. The personal applications are designed to enhance an individual user's experience in the video communication, without involving other users with whom the individual user is engaged in a group video communication session. By way of example, the personal applications may be an application to add video and audio effects, perform translation of content, takes notes, or the like. An individual user may concurrently launch and display multiple personal applications, as he or she desires.

From block 402, the method also proceeds to block 406, at which point the method provides one or more shared applications to multiple users engaged in a group video communication. Shared applications are designed to involve other users. By way of example, most or all of the multiple users engaged in a group video communication session may participate in an activity. By way of example, shared applications may be a card or trivia game, watching or viewing video, document collaboration or the like.

The method proceeds at block 408 to a stage where either personal or shared applications for multiple users engaged in a group video communication are launched. For the personal applications that are launched, only the individual users may view these, as illustrated by block 410. Viewing of the personal applications are blocked or restricted from viewing by other users, only permitting the individual user who launched or used a personal application to view it.

The applications that are selected by the users engaged in a group video communication are recorded, creating an application history, which is displayed to the users, as illustrated by block 412. The method proceeds to block 414, at which point, communication between users sharing an application is established for the purpose of participating in a shared activity, for example playing a card game. Similarly, the individual user is provided access to one or more of the personal applications desired by the particular user.

The method proceeds to block 416, at which point, users are provided with user interface features, which may be any of a variety, such as providing the users with a capability to designate or "pin" a favorite application, or the like.

Figure 4B:
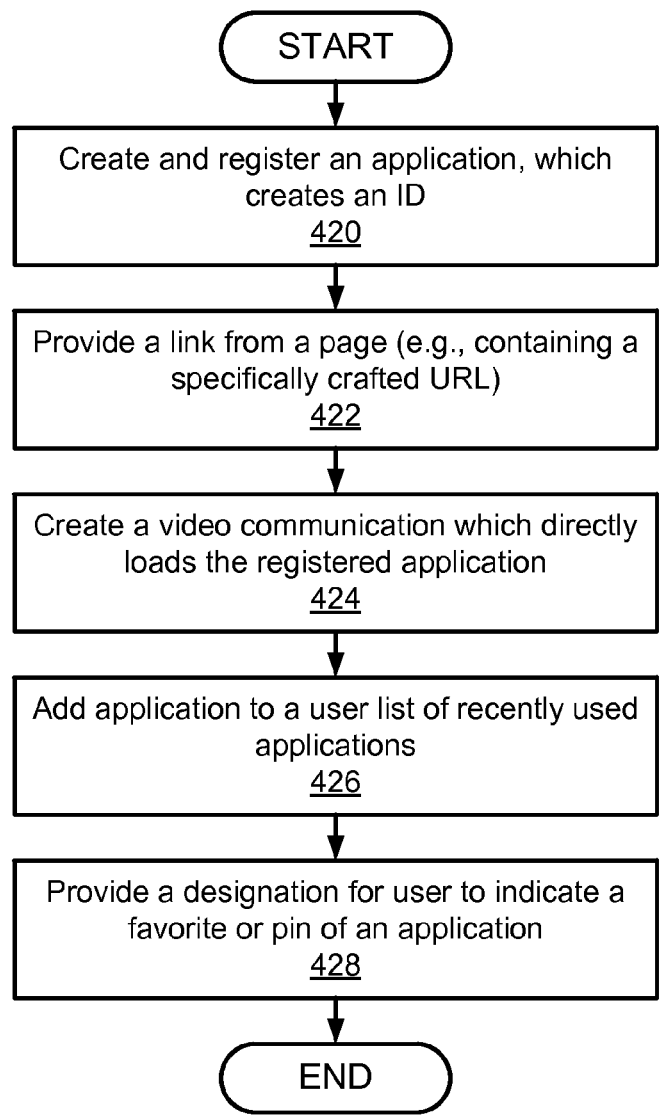
FIG. 4B is one example method of selecting and obtaining "personal" and "shared" applications for individual users.

FIG. 4B illustrates an example method of selecting and obtaining personal and shared applications for a particular user. The method begins at block 420, where a third party provider of applications, creates and registers an application with the social network server 102a or specifically, with the video communication application module 106. The method creates an identification or ID for the application. By way of one example, the video communication application module 106 configures a way of loading an arbitrary web page (contained in an IFRAME) within the group video communication facility (or the area defined by the facility). It also provides access to a Java file, which may be used by those web pages to set up a two-way communication through a defined API ("Application Programming Interface") across the IFRAME border, which allows the web page (designed as a web application) to interact with the user interface 305 and state of the video communication module 106.

At block 422, the method provides a link from a webpage, which by way of one example, may contain a specifically crafted URL for a registered application. The method proceeds to block 424, at which point, a group video communication is created, which directly loads the registered application. Once a registered application is launched, at block 426, the registered application is added to a user list of recently used applications. The URL may launch a group video communication or "hangout" with the specific application loaded. This capability to launch an application is an important viral discovery feature because the URL may be published anywhere on the World Wide Web ("WWW"). In addition, the URL is configured to add the application to each user's history, so that it may be easily browsed by other users. This again is a viral discovery feature. A catalog of applications provides access to a list of registered applications and to combined user histories, which may include applications loaded via a URL for a specific application ("App URL"). At block 428, the user is provided designations to indicate a "favorite" application or "pin" an application.

Figure 4C:
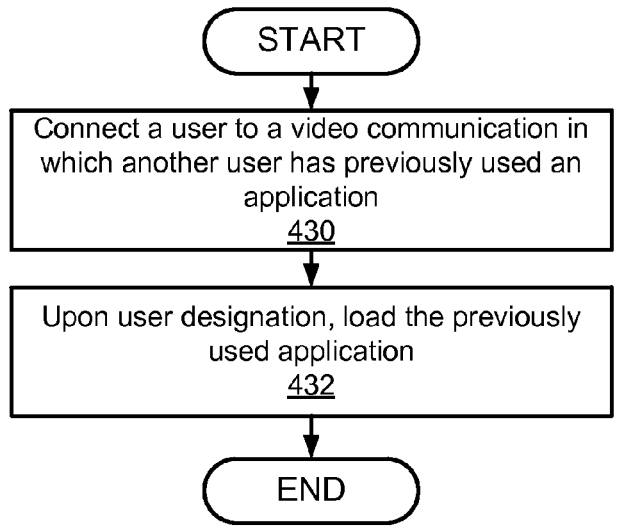
FIG. 4C is one example method of selecting and obtaining a "shared" application for multiple users.

FIG. 4C illustrates yet another example method of selecting and obtaining "shared" applications for multiple users. The method begins and proceeds to block 430, at which point a particular user may be connected to a video communication in which another user has previously used a particular application. The method proceeds to block 432, at which point, upon user request, the previously-used application is loaded.

Figure 4D:
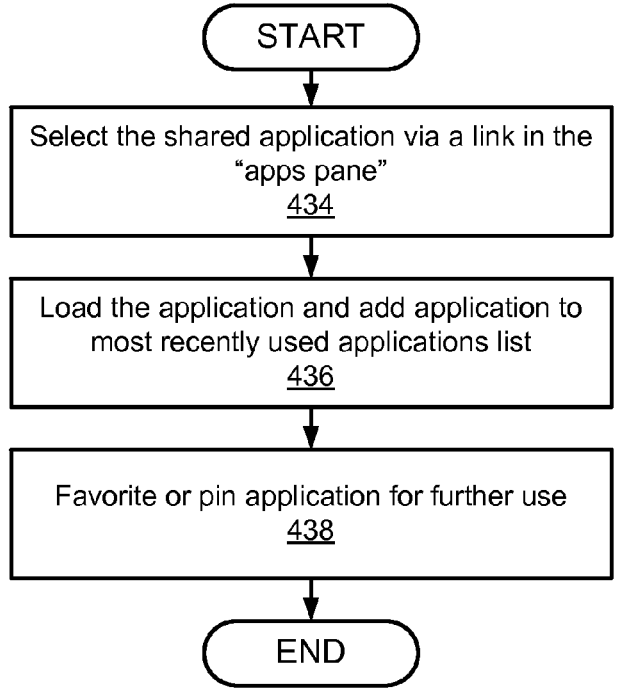
FIG. 4D is one example method of selecting and obtaining a "shared" application for multiple users.

FIG. 4D illustrates yet another example method of selecting and obtaining "shared" applications for use by multiple users. The method begins and proceeds to block 434, at which point, a particular user is provided with an "Apps Pane," from which the particular user may select a particular "shared application." The method proceeds to block 436, at which stage, the particular application selected is loaded on the user device and the application is added to the most recently used application list or history. The method proceeds to block 438, at which point the particular user is provided an opportunity to designate an application as a favorite or the user is allowed to "pin" the application for further use.

Figure 5:
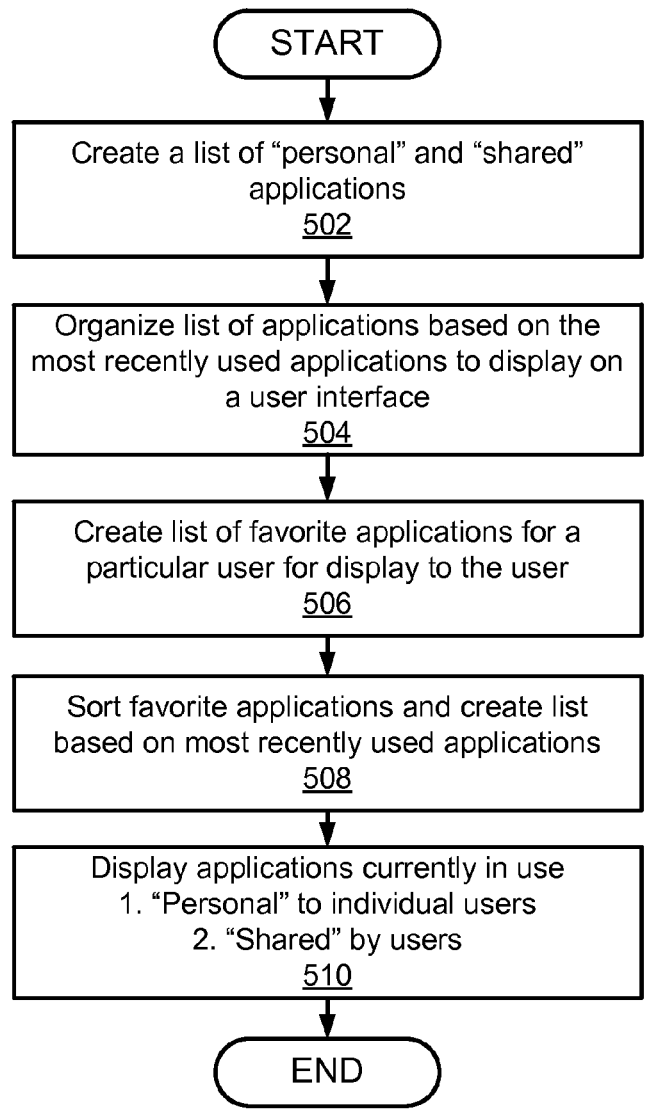
FIG. 5 is one example method for organizing applications for display to a user.

FIG. 5 is an example method for organizing applications for display to a particular user or multiple users. The method starts at block 502, at which point, a list of "personal" and "shared" applications are created for each user, as or after these applications are used by the user. As illustrated at block 504, the list of "personal" and "shared" applications are organized based on the most recently used applications for display on a user interface, which is presented to each user. As further illustrated in block 506, a list of "favorite" applications for a particular user are created, which may be displayed to the user. At block 508, the favorite applications are sorted and a list is created based on the most recently used favorite applications. At block 510, the method displays applications currently in use, to the users, specifically, "personal" applications to individual users, and "shared" applications to all users.

Figure 6:
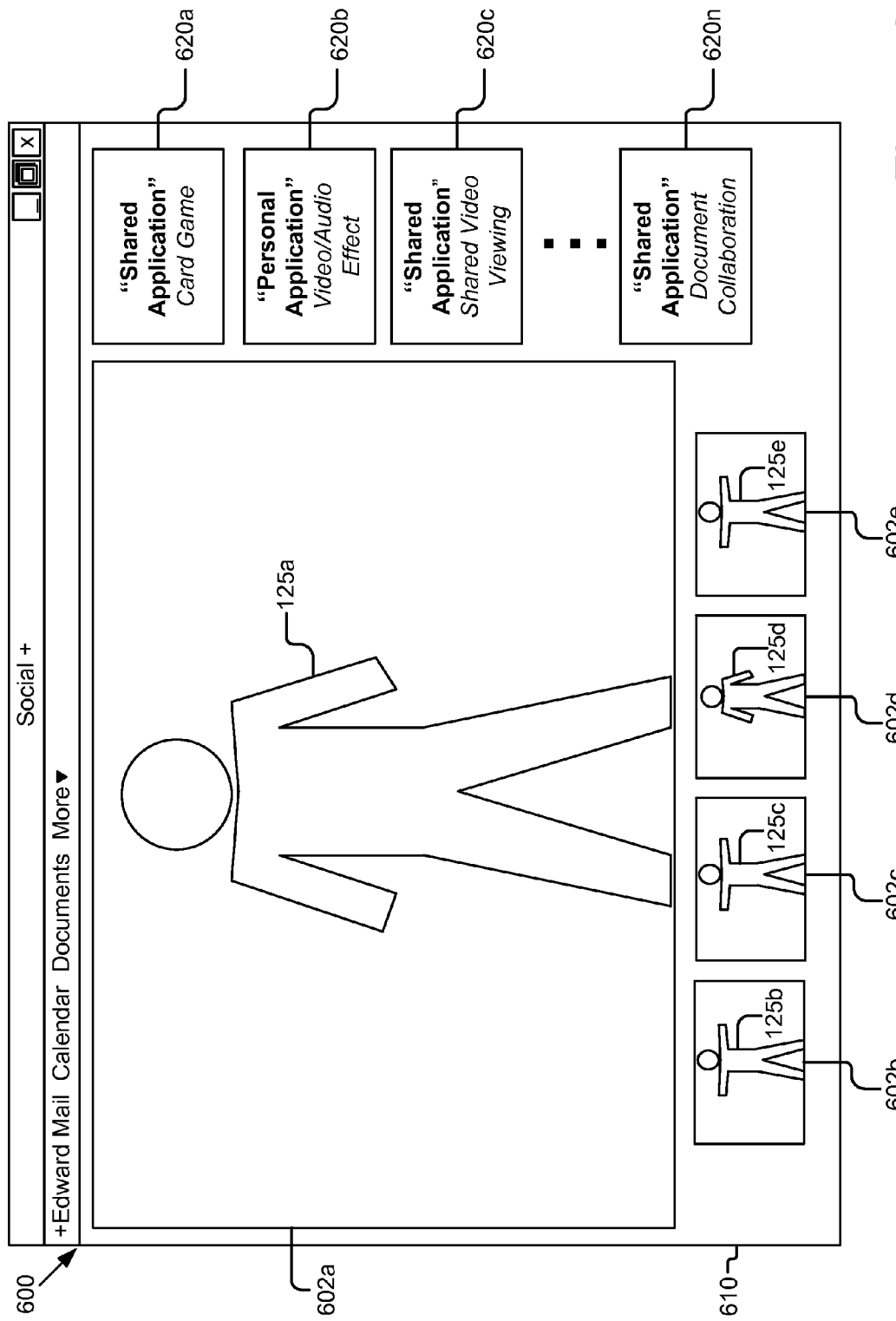
FIG. 6 is a graphical representation of an example user interface illustrating application options that are presented to a particular user.

Referring now to FIG. 6, in one example, each user engaged in a group video communication is presented with a user interface. FIG. 6 illustrates generally one example of a user interface 600. It should be recognized that a user interface may be configured in other ways. The illustrated example shows a user interface for a particular user 125a, within a display panel 602a having a display window or screen 610. The display panel 602a indicates a plurality of tabs or buttons 602a, 602b, 602c, 602d, and 602e to indicate that the other users are engaged in the group video communication session. To the right of the display panel 602a, designations indicate examples of a "shared" application, for example, a card game, at 620a, a "personal" application, at 620b, for example, for video/audio effects, a "shared" application, at 620c, for example, for shared video viewing, and another "shared" application at 620n, for example, for document collaboration.

Figure 7:
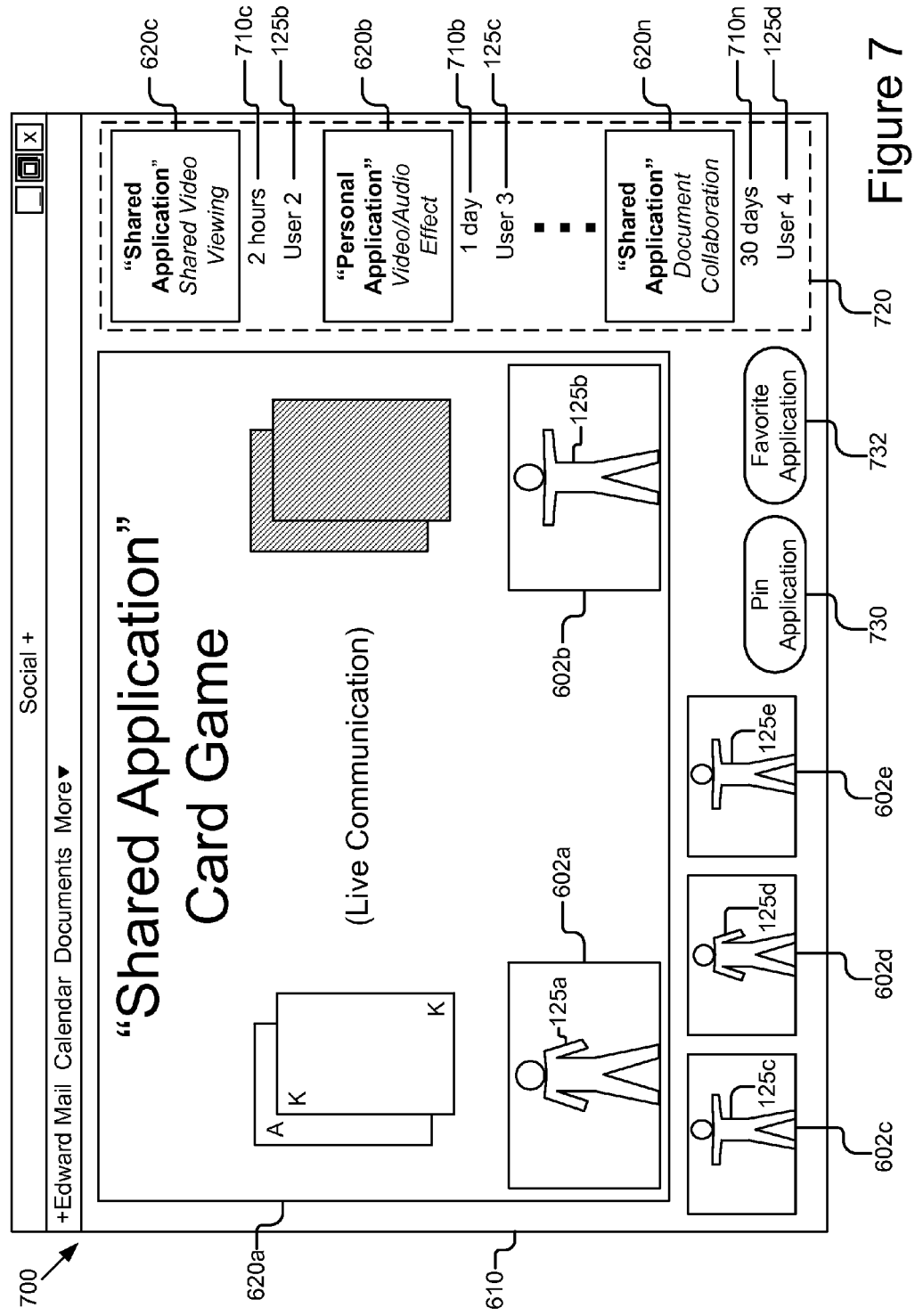
FIG. 7 is a graphical representation of an example user interface illustrating use of one example of a "shared" application by two particular users.

Referring now to FIG. 7, an example of a user interface is illustrated at 700, with a "shared" application. The "shared" application is a card game, in which users 125a and 125b are participants. User 125a is illustrated in a display window or screen 602a and user 125b is illustrated in a display window or screen 602b. Other users 125c, 125d, and 125e, who are not engaged in this game, are illustrated in an appropriate location, for example, the bottom of the user interface 700, in display windows 602*c*, 602*d*, and 602*e*, respectively. The other applications 620*c*, 620*b*, and 620*n* are displayed on the side panel, where users 125*b* (user 2), user 125*c* (user 3), and user 125*d* (user 4) are indicated in order, with an indication of the time duration that the particular application has been in use. For example, the "shared" application for facilitating shared video viewing has been in use for two hours, illustrated by reference numeral 710*c*. Similarly, the "personal" application for creating video/audio effects is illustrated by reference numeral 620*b*, with an indication of the time duration that the personal application has been in use, for example, one day. Another example of a "shared" application, for document collaboration, illustrated by reference numeral 620*n*, is illustrated with an indication of the time duration that the shared application is in use, for example 30 days.

Figure 8:
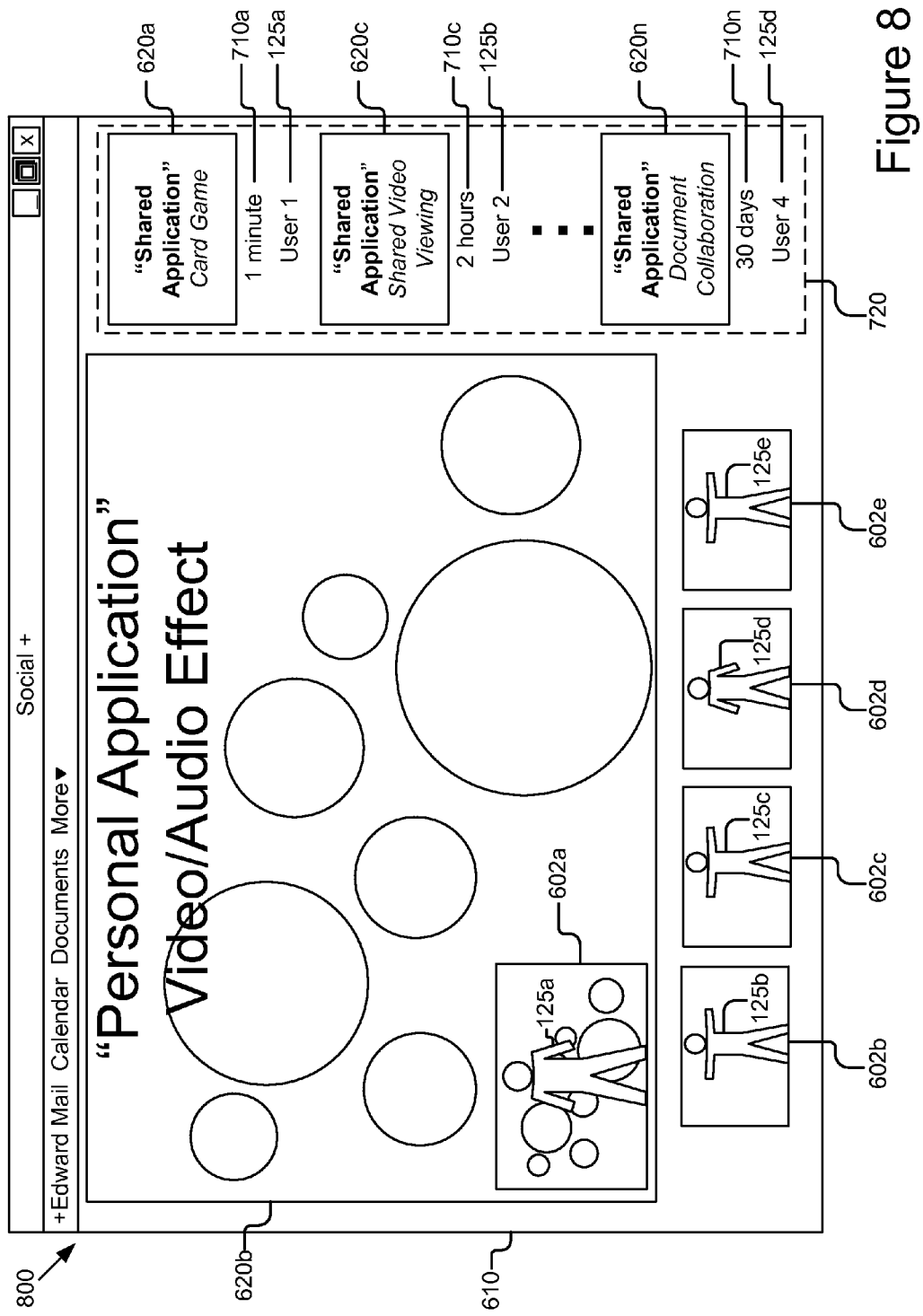
FIG. 8 is a graphical representation of an example user interface illustrating use by a particular user of one example of a "personal" application.

Referring now to FIG. 8, a graphical representation of one example of a user interface 800 indicating a "personal" application is illustrated. The personal application illustrates a video/audio effect (illustrated by circles appearing in the display window 620*b*) to enhance the particular user's experience. The user 125*a* is displayed in a display window 502*a*. At the bottom, other users 125*b*, 125*c*, 125*d*, and 125*e*, engaged in the group video communication, appear in display windows 602*b*, 602*c*, 602*d*, and 602*e*, respectively.

Figure 9:
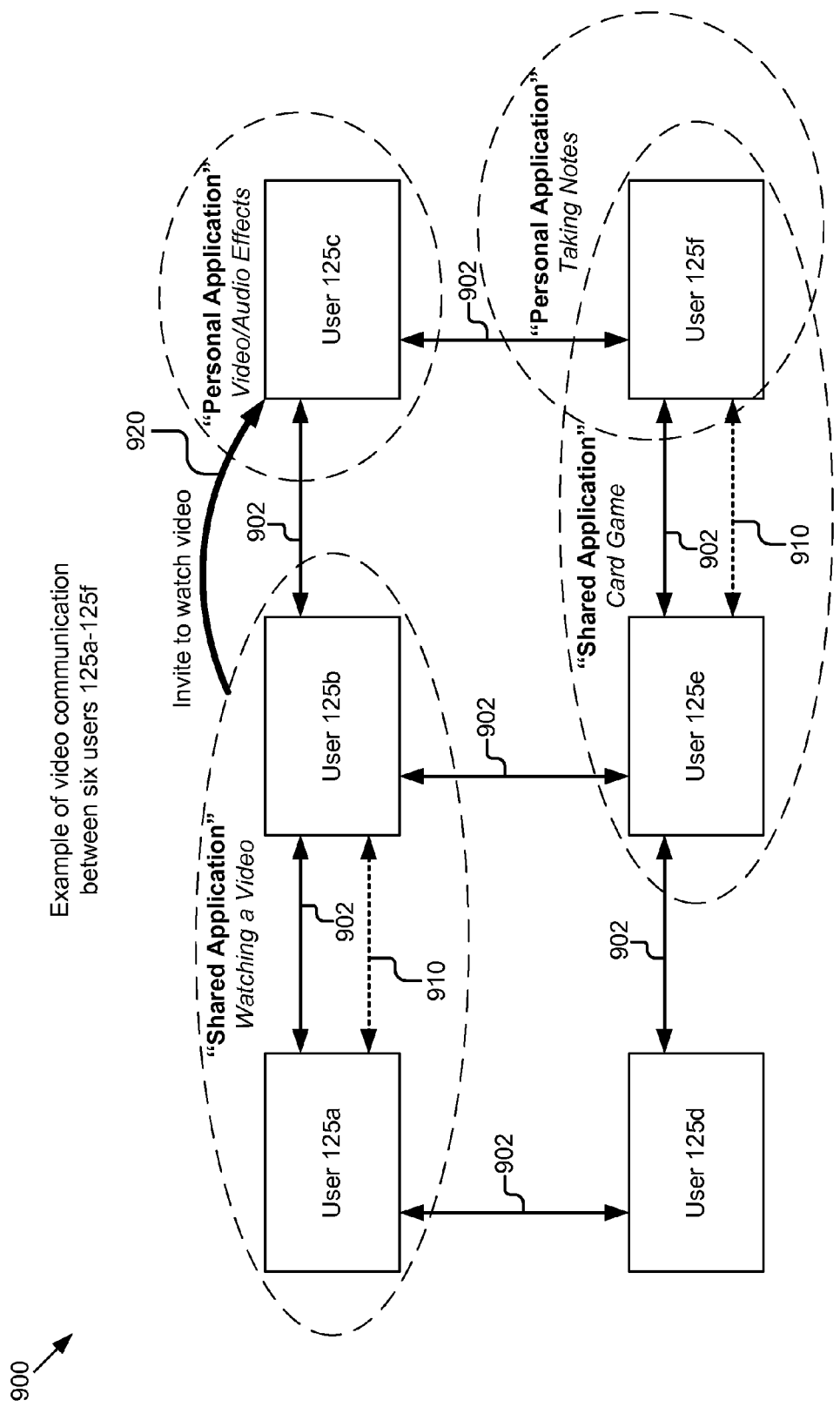
FIG. 9 is a graphical representation of one example of a group video communication session between six particular users.

Referring to FIG. 9, a graphical representation illustrating an example of a group video communication between six users, for example, 125*a* through 125*f*, is illustrated. This example illustrates, by way of example, users 125*a* and 125*b* engaged in a shared application, for example viewing or watching a video. Video communication occurs along a primary communication channel 902 and the shared activity occurs along the communication line 902, with communication channel 910 (shown in broken lines) used for other communications. The circle in broken lines around these two users 125*a* and 125*b* illustrates the shared participation by these users in a shared application. In the example illustrated, user 125*c* is engaged in the "personal" application of enhancing his or her experience, with video/audio effects. This solitary exercise, which excludes other users, is illustrated by the broken lines surrounding user 125*c*. Video communication between user 125*c* and the other users in this group video communication forum, facility, or room, flows along the communication channel, illustrated by line 902. Yet another example illustrates that users 125*e* and 125*f* are engaged in a "shared" application, for example, the card game, where communication concerning the shared activity takes over the video communication flow along the primary channel 902 and any other communication flows along the secondary channel 910.

In the preceding description, for purposes of explanation, numerous specific details are indicated in order to provide a thorough understanding of the technology described. It should be apparent, however, to one skilled in the art that this technology can be practiced without these specific details. In other instances, structures and devices are shown in block diagram form in order to avoid obscuring the technology. For example, the present technology is described with some embodiments indicated above that reference user interfaces and particular hardware. However, the present technology applies to and includes any type of computing device that is configured to receive data and commands, and any devices providing services. Moreover, the present technology is described above, primarily, in the context of group video communication sessions between users of an online community or service; however, those skilled in the art should understand that the present technology applies to any type of group video communication sessions and may be used for other video communication applications other than social networks. In particular, group video communication sessions, in an online service, permit access to personal and shared applications.

Reference in the specification to "one embodiment," "an embodiment," or "some embodiments" means simply that one or more particular features, structures, or characteristics described in connection with the one or more embodiments is included in at least one or more embodiments that are described. The appearances of the phrase "in one embodiment" in various places in the specification are not necessarily all referring to the same embodiment.

Some portions of the detailed descriptions that are above are presented in terms of algorithms and symbolic representations of operations on data bits within a computer memory of either one or more computing devices. These algorithmic descriptions and representations are the means used by those skilled in the data processing arts to most effectively convey the substance of their work to others skilled in the art. An algorithm as indicated here, and generally, is conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the preceding discussion, it should be appreciated that throughout the description, discussions utilizing terms such as "processing," "computing," "calculating," "determining," or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present technology also relates to an apparatus for performing the operations described here. This apparatus may be specially constructed for the required purposes, or it may comprise a general-purpose computer or a mobile device, for example, a phone or tablet, selectively activated or reconfigured by a computer program stored in the computer or mobile device. Such a computer program may be stored in a computer-readable storage medium, such as, but not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

This technology can take the form of an entirely hardware embodiment, an entirely software embodiment, or an embodiment containing both hardware and software components. In some embodiments, the technology is implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate, or transport the program for use by or in connection with the instruction execution system, apparatus, or device.

A data processing system suitable for storing and/or executing program code includes at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Communication units include network adapters, which may also be coupled to the system to enable them to couple to other data processing systems, remote printers, or storage devices, through one or more of either intervening private or public networks. Modems, cable modems, and Ethernet cards are just a few examples of the currently available types of network adapters.

Finally, the algorithms and displays presented in this application are not inherently related to any particular computer or other apparatus. Various general-purpose systems may be used with programs in accordance with the teachings here, or it may prove convenient to construct more specialized apparatus to perform the required method steps. The required structure for a variety of these systems is outlined in the description above. In addition, the present technology is not described with reference to any particular programming language. It should be understood that a variety of programming languages may be used to implement the technology as described here.

The foregoing description of the embodiments of the present technology has been presented for the purposes of illustration and description. It is not intended to be exhaustive or to limit the present technology to the precise form disclosed. Many modifications and variations are possible in light of the above teaching. It is intended that the scope of the present technology be limited not by this detailed description, but rather by the claims of this application. As should be understood by those familiar with the art, the present technology may be embodied in other specific forms, without departing from the spirit or essential characteristics thereof. Likewise, the particular naming and division of the modules, routines, features, attributes, methodologies, and other aspects are not mandatory or significant, and the mechanisms that implement the present disclosure or its features may have different names, divisions and/or formats. Furthermore, as should be apparent to one of ordinary skill in the relevant art, the modules, routines, features, attributes, methodologies and other aspects of the present technology can be implemented as software, hardware, firmware, or any combination of the three. Also, wherever a component, an example of which is a module, of the present technology is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present technology is in no way limited to implementation in any specific programming language, or for any specific operating system or environment. Accordingly, the disclosure of the present technology is intended to be illustrative, but not limiting, of the scope of the present disclosure, which is set forth in the following claims.

What is claimed is:

1. A computer-implemented method for providing access to applications by users during video communication over a network, the method comprising:
   registering an application of a plurality of applications with an online service including creating a link for launching the application, the link being sharable on the online service;
   establishing, using a computing device, a group video communication among a plurality of user devices over the network, the group video communication associated with the application of the plurality of applications, the plurality of applications including one or more personal applications and one or more shared applications for use by at least one user of a plurality of users;
   enabling access by the at least one user of the plurality of users, via a user interface in at least one user device of the plurality of user devices, using the computing device, to the application during the group video communication;
   receiving, using the computing device, a selection of the link by a first user of the plurality of users;
   storing, using the computing device, an identification of the application in a history of applications previously used by the first user of the plurality of users in response to the selection of the link by the first user;
   providing for display, using the computing device, a designation of the history of applications used by the first user to a second user of the plurality of users, wherein the designation is configured to allow the second user to select the application from the history of applications used by the first user to launch the application;
   receiving, using the computing device, a selection by the second user during the group video communication of the application from the history of applications used by the first user;
   storing, using the computing device, the identification of the application in a history of applications previously used by the second user in response to receiving the selection by the second user of the application from the history of applications used by the first user; and
   based at least in part on the selection of the link or the selection of the application from the history of applications used by the first user, allowing the at least one application to be loaded on the at least one user device of the plurality of user devices.

2. A computer-implemented method for providing access to applications by users during video communication over a network, the method comprising:
   registering an application with an online service including creating a link for launching the application, the link being sharable on the online service;
   establishing, using at least one computing device, a group video communication among a plurality of users using a plurality of user devices over the network, the plurality of applications including one or more personal applications and one or more shared applications;

receiving, using the at least one computing device, a selection of the link by a first user of the plurality of users;

storing, using the at least one computing device, an identification of the application in a history of applications previously used by the first user of the plurality of users in response to the selection of the link by the first user;

providing for display, using the at least one computing device, a designation of the history of applications used by the first user to a second user of the plurality of users, wherein the designation is configured to allow the second user to select the application from the history of applications used by the first user to launch the application;

receiving, using the at least one computing device, a selection by the second user during the group video communication of the application from the history of applications used by the first user;

storing, using the at least one computing device, the identification of the application in a history of applications previously used by the second user in response to receiving the selection by the second user of the application from the history of applications used by the first user; and based at least in part on the selection of the link, allowing the at least one application to be loaded on the at least one of the plurality of user devices.

3. A computer-implemented method according to claim 2, further comprising providing a list of most recently used applications for display to the plurality of users during the group video communication, the most recently used list including a list of shared applications that have been used by the users during the group video communication.

4. A computer-implemented method according to claim 2, further comprising:
providing for display a user interface option to the first user or the second user of the plurality of users configured to allow the first or the second user to designate an application as a favorite.

5. A computer-implemented method according to claim 2, further comprising:
providing for display a user interface option to at least certain users of the plurality of users configured to allow any one of the at least certain users to switch between shared applications.

6. A computer-implemented method according to claim 2, further comprising:
providing for display a user interface option to at least certain users of the plurality of users configured to allow any one of the at least certain users to operate a plurality of personal applications concurrently.

7. A computer-implemented method according to claim 2, further comprising:
providing for display a user interface option to at least certain users of the plurality of users configured to allow any one of the at least certain users to operate a personal application concurrently with a shared application involving other users of the plurality of users.

8. A computer-implemented method according to claim 2, further comprising:
transmitting communications relating to group video communication to the plurality of users along a primary channel of communication and in the event of a shared application, using the primary channel of communication for the shared application and providing a second channel of communication for other communications.

9. A computer-implemented method according to claim 2, further comprising at least one or more of the following:
blocking visibility of the application from other users than the first user.

10. A computer-implemented method according to claim 2, further comprising:
providing the link as a URL with the identification that identifies the application.

11. A system for providing access to applications by users during group video communication over a network, the system comprising:
one or more processors; and
a memory storing instructions that, when executed by the one or more processors, cause the system to perform operations comprising:
registering an application with an online service including creating a link for launching the application, the link being sharable on the online service;
establishing, using at least one computing device, a group video communication among a plurality of users using a plurality of user devices over the network, the plurality of applications including one or more personal applications and one or more shared applications;
receiving, using the at least one computing device, a selection of the link by a first user of the plurality of users;
storing, using the at least one computing device, an identification of the application in a history of applications previously used by the first user of the plurality of users in response to the selection of the link by the first user;
providing for display, using the at least one computing device, a designation of the history of applications used by the first user to a second user of the plurality of users, wherein the designation is configured to allow the second user to select the application from the history of applications used by the first user to launch the application;
receiving, using the at least one computing device, a selection by the second user during the group video communication of the application from the history of applications used by the first user;
storing, using the at least one computing device, the identification of the application in a history of applications previously used by the second user in response to receiving the selection by the second user of the application from the history of applications used by the first user; and
based at least in part on the selection of the link, allowing the at least one application to be loaded on the at least one of the plurality of user devices.

12. A system according to claim 11, further comprising:
data storage with at least one of a history of applications stored as the applications are used by at least certain of the plurality of users and a history of the applications previously used by at least certain of the plurality of users.

13. A system according to claim 12, wherein the one or more processors sort the history of the applications by order of most recently used applications by the at least certain of the plurality of users.

14. A system according to claim 12, further comprising:
a user interface option configured to perform at least one of the following:

1) enable a particular user from the plurality of users to designate a personal application as a favorite; 2) enable a particular user from the plurality of users to switch between shared applications; 3) allow any one of the plurality of users to operate a plurality of personal applications concurrently; and 4) allow any one of the plurality of users to operate a plurality of personal applications concurrently with one shared application involving other users.

15. A system according to claim 12, further comprising: a primary channel of communication for the group video communication between the plurality of users, wherein the primary channel of communication becomes the channel of communication for the shared application; and a secondary channel of communication being used for other communication.

16. A system according to claim 12, wherein the video communication module blocks visibility of a personal application from other users than a user who previously used the personal application.

17. A system according to claim 12, wherein the communication unit is configured to connect the first user to a video communication session in which a third user has previously used an application of the plurality of applications; and wherein the video communication module loads the previously-used application upon designation by the first user.

18. A system according to claim 12, wherein an application is identified by an identification in a URL assigned to the application and wherein the URL is used by the user to perform one or more of 1) launch the application and 2) add the application to a user history, facilitating browsing by other users.

19. A system according to claim 12, further comprising a catalog configured to provide access to a list of registered applications and to combined user histories including applications loaded from an application URL.

20. A system according to claim 11, further comprising:
data storage with a history of personal applications previously used by the first user of the plurality of users; and a user interface for designating the history of the personal applications used by the first-user, to the first user, wherein the designation is configured to allow the first user to select one or more personal applications from the history to launch the one or more personal applications.

* * * * *